United States Patent [19]
Gilbert

[11] 3,722,333
[45] Mar. 27, 1973

[54] MULTI-SPINDLE AUTOMATIC LATHES

[75] Inventor: Harold James Gilbert, Coventry, England

[73] Assignee: Wickman Machine Tool Sales Limited, The Hill, Coventry, England

[22] Filed: Aug. 5, 1970

[21] Appl. No.: 61,372

[30] Foreign Application Priority Data

Aug. 5, 1969 Great Britain......................39,056/69

[52] U.S. Cl.............................................82/29, 82/3
[51] Int. Cl. .............................................B23b 19/02
[58] Field of Search........................82/3, 29; 29/38 B

[56] References Cited

UNITED STATES PATENTS

| | | | |
|---|---|---|---|
| 3,365,990 | 1/1968 | Jacoby | 82/29 |
| 2,825,121 | 3/1958 | Williams | 82/3 X |
| 2,118,024 | 5/1938 | Potter et al. | 29/38 B |

*Primary Examiner*—Leonidas Vlachos
*Attorney*—Holman & Stern

[57] ABSTRACT

A multi-spindle automatic lathe in which a spindle drum is indexible in a housing, with a plurality of work spindles being carried by the drum, gearing interconnecting a drive means with the work spindles to provide at least one work spindle speed in one direction of rotation and at least one work spindle speed in the opposite direction of rotation. A pair of clutches are mounted on each work spindle and are selectively actuable for drivingly connecting the drive means via the gearing to the work spindle so that each work spindle can be driven in either direction of rotation regardless of the direction of rotation of the other work spindles.

2 Claims, 2 Drawing Figures

MULTI-SPINDLE AUTOMATIC LATHES

This invention relates to multi-spindle automatic lathes and has as its object the provision of such a lathe in an improved form.

In accordance with the invention, there is provided a multispindle automatic lathe comprising a housing, a spindle drum indexible in the housing, a plurality of work spindles carried by the spindle drums, a plurality of layshafts carried by a spindle drum, a driving shaft, a single driving gear on the driving shaft, first and second gears mounted on each work spindle for rotation relative thereto, first and second gears mounted on each layshaft for rotation therewith, two idler gears, one of the gears on the layshaft meshing with the idler gears and each idler gear meshing with an adjacent one of the gears of the work spindle, the driving gear on the driving shaft meshing with the other of the gears on the work spindle, and clutch means mounted on each work spindle selectively engageable with one of the gears on the work spindle for drivingly connecting the drive shaft to the work spindles to effect rotation of each work spindle in either direction of rotation regardless of the direction of rotation of the other work spindles.

Conveniently, the drive means comprises a driving shaft and a plurality of layshafts, the latter being carried by said spindle drum.

Figure 1:
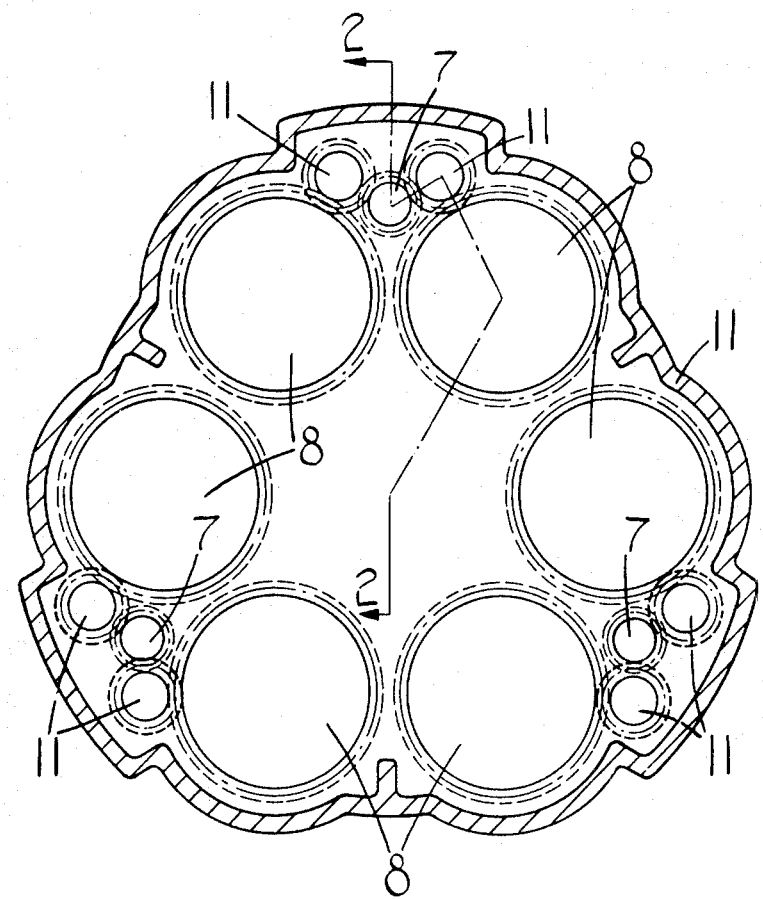
Figure 2:
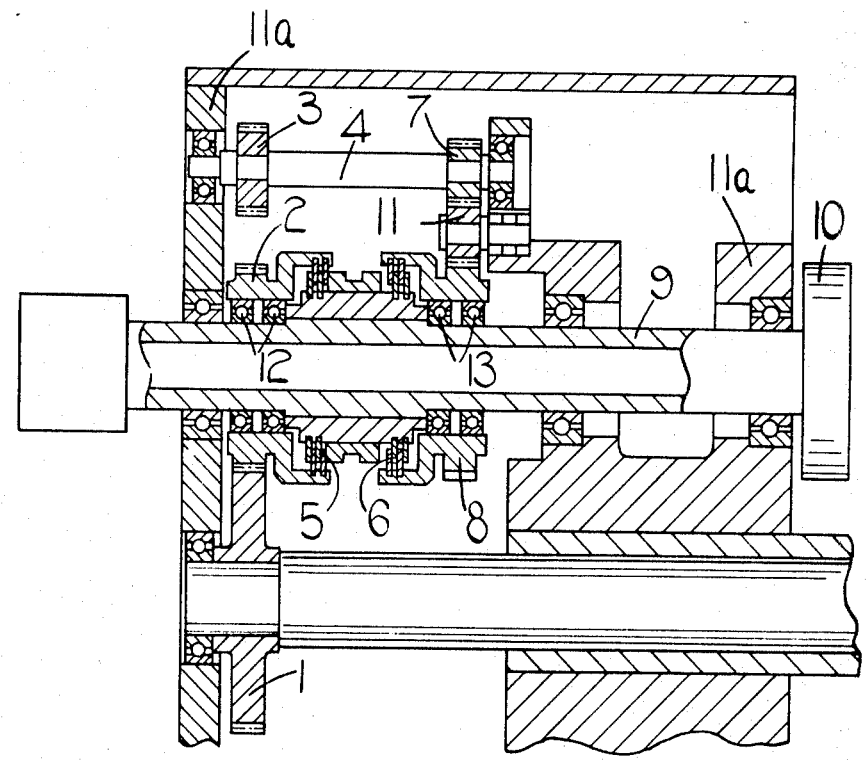

One example of a multi-spindle automatic lathe constructed in accordance with the present invention will now be described with reference to the accompanying drawings wherein FIG. 1 is a schematic end view of gearing forming part of the lathe and FIG. 2 is a sectional view on the line 2—2 of FIG. 1 of a portion of the lathe.

Referring to the drawings the multi-spindle lathe shown therein is provided with a plurality of work spindles (for example 6), one of such spindles being indicated by reference numeral 9 in FIG. 2, one end of each spindle being provided with a chuck 10 for holding a work piece. The work spindles are carried by a spindle drum 11a mounted in a housing (not shown) which is indexable in the housing.

For driving the work spindles there is provided a centrally arranged main driving shaft on which is mounted a single driving gear 1 which is continuously in mesh with an annular gear 2 provided on each of the work spindles 9. Each gear 2 is mounted on bearings 12 so that it can rotate relative to the associated work spindle 9 but it is connected to one part of a friction clutch 5 the other part of which is connected to the work spindle 9 so that when said clutch 5 is engaged the associated spindle 9 will be driven from the main driving shaft and gear 1 through the gear 2.

There is also provided a plurality of layshafts 4 and each layshaft has at its two ends a pair of gears 3 and 7 of different diameter secured to the layshaft so as to be rotatable therewith. Each layshaft is mounted in bearings in the spindle drum 11 and as seen in FIG. 1 three layshafts are provided in the example now described, the layshafts being arranged so that each of the gears 3 engages a gear 2 from each of two work spindles 9. The work spindles themselves are of course arranged symmetrically around the exterior of the main driving shaft.

Each work spindle 9 is also provided with another annular gear 8 which can rotate relative to the work spindle on bearings 13 but which is connected to one part of a further friction clutch 6, the other part of which is connected to the work spindle so as to be rotatable therewith. The gear 7 of each of the three layshafts meshes with two idler gears 11 also supported in suitable bearings for rotation in the spindle drum and each of said idler gears 11 meshes with the adjacent gear 8 of a work spindle 9.

Furthermore any convenient mechanism is provided for engaging one or the other of the two clutches 5 and 6 on each of the work spindles 9. Thus when clutch 5 is engaged clutch 6 is disengaged and vice versa. With clutch 5 engaged a work spindle 9 will be driven from the gear 1 through the gear 2 as previously explained and under these conditions the layshaft 4 will also rotate but since the clutch 6 will be disengaged the gears 7 and 11 will simply drive the gear 8 relative to the work spindle 9 and said gear 8 will not impart any drive to the work spindle. However, if clutch 5 is disengaged and clutch 6 engaged a drive will be taken from the gear 1 through gear 2 (which then can rotate relative to the work spindle 9), gear 3, layshaft 4, gear 7, gear 11 and gear 8 which is now connected to the work spindle and will therefore drive said spindle. Owing however to the provision of the idler gear 11 the work spindle 9 will now be driven in a direction of rotation which is opposite to the direction of rotation imparted through the clutch 5 so that reversal of the direction of rotation of any work spindle 9 can be obtained by manipulation of the clutches 5 and 6.

A construction as above-described provides the great advantage that the direction of movement of heavy swarf which in use would be produced by the lathe can be controlled so that such swarf is led away from the lathe. Thus it is commonly arranged that the heaviest cuts on a work piece are taken whilst the workpiece is disposed at the lowermost positions to which the work spindles can be indexed. In other words in the arrangement shown in FIG. 1 relatively heavy cuts may be made on a workpiece whilst it is in the two lowermost work spindle positions. If both of the spindles are arranged to rotate in the same direction of rotation one cutting tool will ordinarily be acting so that the swarf removed by the tool will be directed downwardly away from the machine but the other cutting tool will have the effect of at least initially directing the swarf removed by said tool upwardly and unless elaborate precautions are taken considerable inconvenience and loss of working time can be experienced by reason of swarf becoming jammed in the machine. With the present invention however, one of the two lowermost work spindles can be reversed and the associated cutting tool arranged so that the swarf produced by said tool will also be directed downwardly away from the remainder of the lathe.

In an alternative embodiment of the invention the gear 1 may co-act with the gear 8 instead of co-acting with the gear 2 thus making for a shorter main driving shaft.

Having thus described my invention what I claim as new and desire to secure by Letters Patent is:

1. A multi-spindle automatic lathe comprising a housing, a spindle drum indexible in the housing, a plurality of work spindles carried by the spindle drum, a plurality of layshafts mounted in the spindle drum, a driving shaft, a single driving gear mounted on the driving shaft, first and second gears mounted on each work spindle for rotation relative thereto, first and second gears mounted on each layshaft for rotation therewith, two idler gears, one of the gears on the layshaft meshing with the idler gears and each idler gear meshing with an adjacent one of the gears of the work spindle, said single driving gear on the driving shaft meshing with the other of the gears of the work spindle, and clutch means mounted on each work spindle and selectively engageable with the first and second gears on the work spindle for drivingly connecting the driving shaft to the work spindles to effect rotation of each work spindle in either direction of rotation regardless of the direction of rotation of the other work spindles.

2. The multi-spindle automatic lathe as claimed in claim 1 in which the layshafts are equal in number to half the number of work spindles, and the gear on the layshaft meshing with the idler gears being of lesser diameter than the other gear on the layshaft.

* * * * *